Sept. 15, 1959    A. M. THOMPSON    2,904,293
CONDUIT FASTENER
Filed Feb. 4, 1955
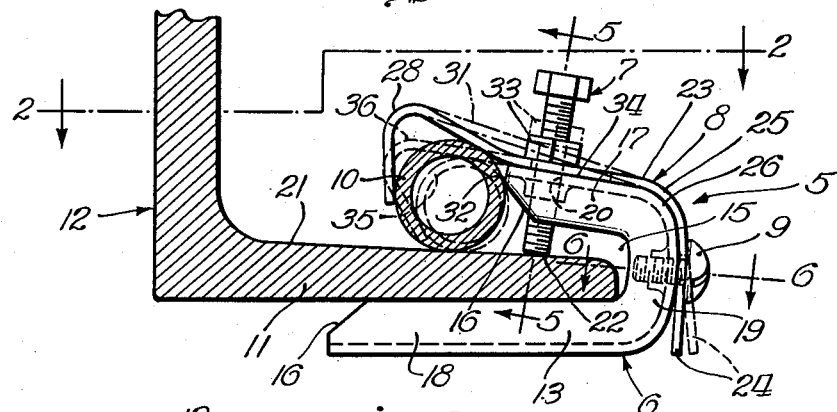
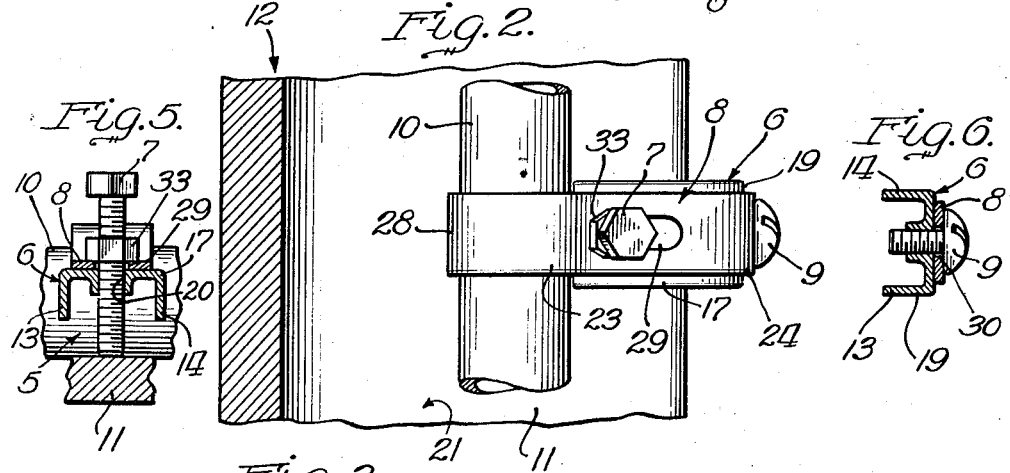
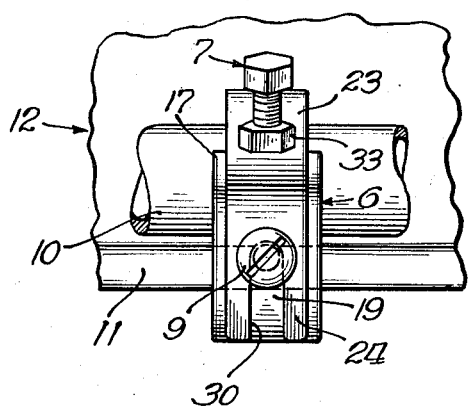
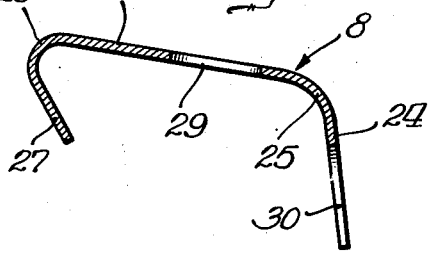
INVENTOR.
Arthur M. Thompson
BY
Eberhard E. Wulley
Atty.

United States Patent Office 2,904,293
Patented Sept. 15, 1959

2,904,293

CONDUIT FASTENER

Arthur M. Thompson, Chicago, Ill.

Application February 4, 1955, Serial No. 486,187

7 Claims. (Cl. 248—72)

This invention relates to a fastener to mount various pieces of equipment on structural building members.

More specifically the invention is directed to fastening mechanisms utilized for securing longitudinal members such as electrical or mechanical conduits and similar protective or conductive units to various building members such as angle irons, H-beams, channel beams and the like. And the invention comprises an improvement over the mechanisms shown and described in my copending application Serial No. 354,466, filed May 12, 1953, and relating to Pipe Fastening Means.

One of the objects of this invention is to provide a simple convenient fastening clamp unit that may be easily and efficiently used to mount a conduit upon a beam member in any type of structure adapted for holding and supporting electrical, mechanical or fluid carrying conduits for service requirements or for mounting other analogous devices.

Another object of the present invention is to provide a fastening unit for conduits or the like which is readily used for accommodating several different diameter conduits within predetermined size ranges.

Another object of the present invention is to provide a securing mechanism on a conduit fastener which acts in the dual capacity of securing the clamp portion of the fastener to a structural beam member and wherein such securing mechanism further provides an adjustable means to cause the conduit engaging part of the fastener to securely engage the surface of the conduit that is being mounted upon the structural beam member.

A still further object of the invention resides in the provision of a fastening device having an endwise adjustable conduit securing strap so designed for better ease in the application of the fastener to a supporting beam and to accommodate different diameter conduits.

Another object of this invention resides in the provision of a securing strap for the fastener which strap terminates in a predetermined end configuration to accommodate itself to the conduit exterior and to adjust itself to the different diameter conduits or pipes being mounted.

Other objects and advantages of this invention will hereinafter appear in the following detailed description of the invention having reference to the accompanying drawings forming a part of this specification and illustrating one preferred construction of the conduit fastener of this invention.

In the drawings:

Figure 1 is a side elevational view of the fastening device of this invention illustrating the same as it appears in operative conduit clamping relation with respect to a flange portion of a structural beam member with the conduit and beam shown in section;

Figure 2 is a plan section view taken substantially along the plane of the line 2—2 in Figure 1, the fastening device appearing entirely in elevation;

Figure 3 is an end elevational view of the fastening device as seen from the right in Figure 1;

Figure 4 is a longitudinal median plane cross sectional view of the conduit securing strap of the fastening device illustrating certain details of construction thereof;

Figure 5 is a transverse cross sectional view of the end portion of the fastening clamp taken substantially along the line 5—5 in Figure 1; and Figure 6 is another transverse cross sectional view of an intermediate portion of the fastening clamp as taken along the line 6—6 in Figure 1.

As seen in Figure 1 of the drawings, the fastening device 5 comprises, in general, a C-clamp 6, a securing bolt 7, an adjustable conduit strap 8 and a strap screw 9. As applied in Figure 1, the device 5 is illustrated as operatively fastening a conduit 10 upon a flange 11 of a structural beam 12.

The clamp 6 is U-shaped in transverse cross section as seen in Figure 5 with the legs 13 and 14 all facing inwardly toward the beam flange 11 receiving gap 15 of the clamp 6 with each of the ends of the legs 13 and 14 being beveled as at 16 to better facilitate guiding the clamp upon the flange portion of a supporting beam 12.

The clamp 6 comprises a short leg 17 and a long leg 18 connected by an intermediate bridge 19 thus outlining the beam flange receiving gap 15 previously mentioned. The short leg 17 carries the securing bolt 7 and is normally spaced from the supporting beam flange 11 as illustrated in Figure 1, while the long leg 18 provides a double edge extended frictional and reactionary contact with the underside of the flange 11 of beam 12. Both legs 17 and 18 are arranged in outwardly diverging fashion by the bridge 19 and are so disposed from said bridge end of the clamp 6.

The securing bolt 7 is adjustably screwed through the threaded bore 20 in clamp leg 17 and is thereby mounted in a position that is arranged normal to the top surface plane of leg 17 so as to be angularly positioned with respect to the surface 21 of flange 11 and to present one edge of the bolt end angularly to the surface 21 to bite into that surface at 22. Thus bolt 7 not only creates an endwise compressive securing force when tightened, but the bolt also establishes a surface recess or depression in the face of the angle flange on the side of the bolt that is most vulnerable to lateral withdrawal from the beam flange 11 particularly since surface 21 normally presents an outward downslope as shown in Figure 1. Bolt 7 is normally hardened steel and capable of being well set into the metal of the beam while simultaneously subjecting leg 17 of clamp 6 to a spring action to further help to hold the clamp 6 in place upon flange 11.

The adjustable conduit strap 8 is relatively flexible and comprises a resilient band functioning as the conduit securing or fastening member of the fastener 5 and which is best illustrated in detail in Figure 4 in its original form and before such a band assumes the final operative shape illustrated in Figure 1. Strap 8 consists of an intermediate support or resting section 23 terminating at one end in a depending tailpiece 24 connected with section 23 by a curved section 25 formed to normally follow the contour of the curved part 26 of the clamp 6. The other end of the straight section 23 terminates in a depending reversed hook 27 disposed in a predetermined angular relation with respect to section 23 and connected thereto with the rather sharper curved part 28 that is normally formed on a radius smaller than the radius of the minimum diameter conduit to which the fastening device 5 is adapted for the purpose of fastening the conduit to a beam part.

Strap 8 includes an elongated slot 29 in section 23 and an elongated notch 30 in tailpiece 24 opening outwardly of the free end thereof. Screw 7 is connected with leg 17 through slot 29 in strap 8 and the strap screw 9 is secured with bridge 19 through slot or notch 30, With slots 29 and 30 in strap 8 the latter is capable of endwise adjustment relative to clamp 6 from a minimum diameter conduit engaging relation to a larger diameter conduit as appears in broken and full lines respectively in Figure 1. Tailpiece 24 will automatically swing out farther as strap 8 is adjusted outwardly of the free end 16 of leg 17 of clamp 6 and curved section 25 of clamp 7 will expand or wrap so to speak about the curved part 26 of clamp 6. Outsprung end 24 can then subsequently be bent against bridge 19 and secured by strap screw 9.

After securing clamp 6 in place with screw bolt 7 to hold the device 5 fixed to beam 12, strap 8 is adjusted as above explained to obtain a wedge contact of the conduit 10 by means of the reversed hook 27 and adjacent part of section 23 of strap 8 which will normally dispose section 23 along a path shown in dot and dash lines at 31 in Figure 1, with conduit 10 resting against the front end 32 of the leg 17 of clamp 6.

Screw bolt 7 carries an adjusting lock nut 33 that serves the dual purpose of bending the back of section 23 of strap 8 to induce the V-end of the strap 8 to tightly grip the conduit 10 forcing it down upon flange 11 of beam 12 and against the end 32 of leg 17 of clamp 6. When strap 23 is forced against the top surface 34 of leg 17 the nut then not only locks the strap in clamping position, but then also locks screw bolt 7 against vibrational loosening or accidental retraction. Strap 8 is thus securely held between bolt 7 and strap screw 9 in fastening conduit 10 in place upon beam 12 and as best illustrated in full lines in Figure 1. The V-end of the strap is in this condition slightly spread open to accommodate conduit 10. A smaller conduit 35 is illustrated in broken lines in Figure 1 and strap 8 is adapted to hold this conduit in the broken line position 36 as also indicated in Figure 1.

With the V-end strap it is readily possible to bend reverse hook 27 with pliers or in any other fashion for certain adjustments. It is also possible to tap the curved end 28 of strap 8 while in contact with a conduit to open the V-end when desired. With these possible auxiliary adjustments together with the feature of endwise regulation of the position of strap 8 in relation to leg 17 of clamp 6 all further aided by the wrap around end tailpiece 24, the device provides a very versatile clamp unit. Also, the strap 8 is guided by bolt 7 and screw 9, and the lock nut 33 provides a first strap anchoring unit while the strap screw 9 then fastens tailpiece 24 to the bridge to definitely prevent any longitudinal motion of the strap in a direction outwardly of the end 32 of leg 17 of clamp 6 primarily attributed to the coacting wrap around portion 25 of the strap against the curved portion 26 of the clamp 6.

One other advantage of the present clamp device 5 is the ability of the clamp strap V-end to permit a certain amount of forced endwise movement of the conduit upon flange 11 under expansion or contraction. The V-end has the ability to open slightly and accommodate such longitudinal motion of the conduit and very little if any turning torque is transmitted to the clamp 6 per se. Obviously, the double edge contact of the long leg 18 upon flange 11 would adequately counteract any loosening or turning of the clamp 6 under all normal conditions of operation.

The foregoing description has been directed to a preferred construction of a conduit fastener constructed according to the fundamental concept of the present invention. Certain changes and modifications, however, are contemplated in the individual elements and in the combinations shown without departing from the original inventive concept. Such variations in construction shall, however, be governed by the breadth and scope of the language of the following appended claims.

What I claim is:

1. A fastener adapted for securing a conduit directly in contact against one surface of a flange member comprising a clamp unit having a securing means adapted for releasable connection with said one surface of said flange member, a strap unit carried by said clamp unit and arranged for direct surface contact with a conduit to hold the conduit against said one surface of the flange member, said strap unit comprising a resilient band having one end thereof arranged to project outwardly beyond one terminal end portion of said clamp unit into a location over said conduit and having a reversed hook thereon to confine the conduit between said end portion of said clamp unit and said one surface of said flange member, said reversed hook of said band defining a V-shaped band section opening outwardly in the direction of the end of said clamp unit and providing dual point contact means to engage spaced points on said conduit exterior.

2. A fastener adapted for securing a conduit upon one surface portion of a single outwardly projecting flange of a beam structure comprising a double legged clamp to straddle the outer edge of said single flange and having one leg thereof adapted for coincident engagement with one surface of said single flange, the other leg thereof occupying a position spaced away from the opposite surface of said single flange, a conduit securing band for one of said clamp legs, and a fastening mechanism connected with one of said clamp legs and adapted to engage one surface of said single flange of said beam to mount the clamp in fixed position upon said single flange, and mounting means carried by said fastening mechanism to secure said band in fixed relation with respect to said one clamp leg and to simultaneously urge said band into operative holding engagement with said conduit.

3. A fastener adapted for securing a conduit to a flange of a beam structure comprising a double legged clamp with one leg thereof adapted for coincident engagement with one surface of said flange, the other leg thereof occupying a position spaced away from the opposite flange surface, a conduit securing band, and fastening mechanism connected with one of said clamp legs and adapted to mount the clamp in fixed position upon said flange, and said fastening mechanism including a mounting means to secure said band in fixed relation with respect to said one clamp leg and to simultaneously urge said band into operative holding engagement with said conduit, said fastening mechanism comprising a threaded bolt and said mounting means comprising a lock nut carried upon said threaded bolt.

4. A fastener adapted for securing a conduit to a flange of a beam structure comprising a double legged clamp with one leg thereof adapted for coincident engagement with one surface of said flange, the other leg thereof occupying a position spaced away from the opposite flange surface, a conduit securing band, and a fastening member connected with one of the clamp legs and arranged to engage said flange to secure said clamp in fixed relation upon said flange, said band having a slot therein to receive said fastening member therethrough to permit adjustable endwise positioning of said band relative to said one clamp leg, and a band securing member carried upon said fastening member and adapted to mount said band in fixed relation upon said one clamp leg and to urge said band into operative holding engagement with said conduit.

5. A fastener adapted for securing a conduit to a flange of a beam structure comprising a double legged clamp with one leg thereof adapted for coincident engagement with one surface of said flange, the other leg thereof occupying a position spaced away from the opposite flange surface, a conduit securing band, and a fastening member connected with one of the clamp legs and arranged to engage said flange to secured said clamp in fixed relation upon said flange, said band having a slot therein to receive said fastening member therethrough to permit adjustable endwise positioning of said band relative to said one clamp leg, and a band securing member carried upon said fastening member and adapted to mount said band in fixed relation upon said one clamp leg and to urge said band into operative holding engagement with said conduit, said band further including a tailpiece to partially encircle a portion of the clamp, and screw means to secure said tailpiece to said clamp.

6. A fastener adapted for securing a conduit to a flange of a beam structure comprising a double legged clamp with one leg thereof adapted for coincident engagement with one surface of said flange, the other leg thereof occupying a position spaced away from the opposite flange surface, a conduit securing band, and a fastening member connected with one of the clamp legs and arranged to engage said flange to secure said clamp in fixed relation upon said flange, said band having a slot therein to receive said fastening member therethrough to permit adjustable endwise positioning of said band relative to said one clamp leg, and a band securing member carried upon said fastening member and adapted to mount said band in fixed relation upon said one clamp leg and to urge said band into operative holding engagement with said conduit, said band further including a tailpiece to partially encircle a portion of the clamp, and screw means to secure said tailpiece to said clamp, said tailpiece also including a slotted portion at said screw means to further accommodate the adjustable endwise positioning of said band relative to said one clamp leg.

7. A fastener to mount a conduit upon a support comprising a clamp, screw means to fasten said clamp to said support, said clamp having a leg thereon disposed in a given angular relation with respect to an adjacent surface of said support, a conduit holding band arranged in a position adjacent said clamp leg and to have one portion of the band extend outwardly from the end of the leg to engage the conduit, and band fastening means carried by said screw means and adapted to force said band into fixed position upon said clamp leg and to simultaneously cause the projecting portion of the band to tightly and frictionally grip the exterior of said conduit in a direction so as to hold the latter against said support and in a position in front of said clamp leg.

References Cited in the file of this patent
UNITED STATES PATENTS

| | | |
|---|---|---|
| 956,869 | Van Wye | May 3, 1910 |
| 2,442,295 | Kuendel | May 25, 1948 |
| 2,529,153 | Hain | Nov. 7, 1950 |